Feb. 27, 1962 W. L. MORRISON 3,022,636
METHOD AND APPARATUS FOR FREEZING COOKED FOODS
Filed Feb. 29, 1960 4 Sheets-Sheet 2
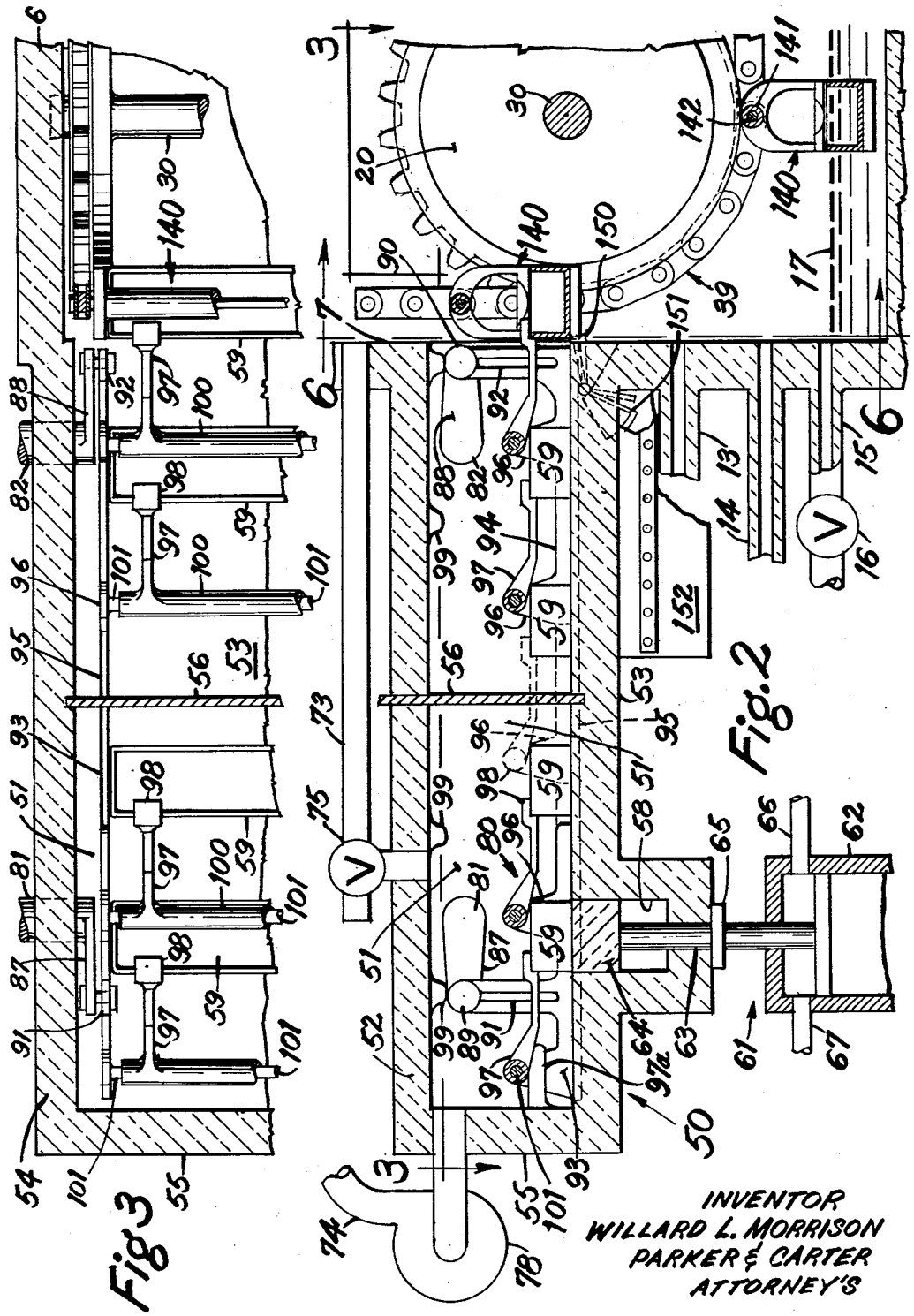
INVENTOR
WILLARD L. MORRISON
PARKER & CARTER
ATTORNEY'S

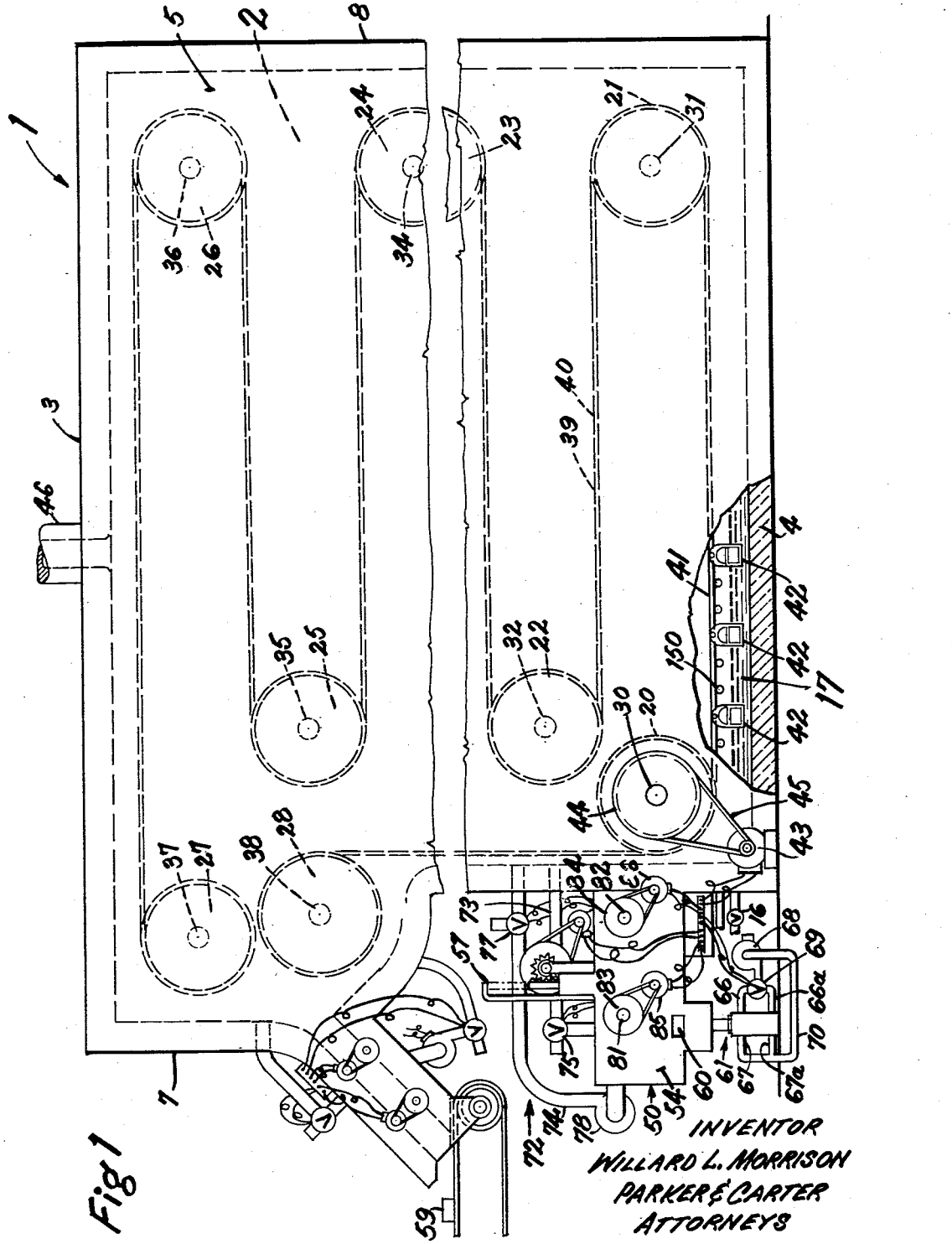

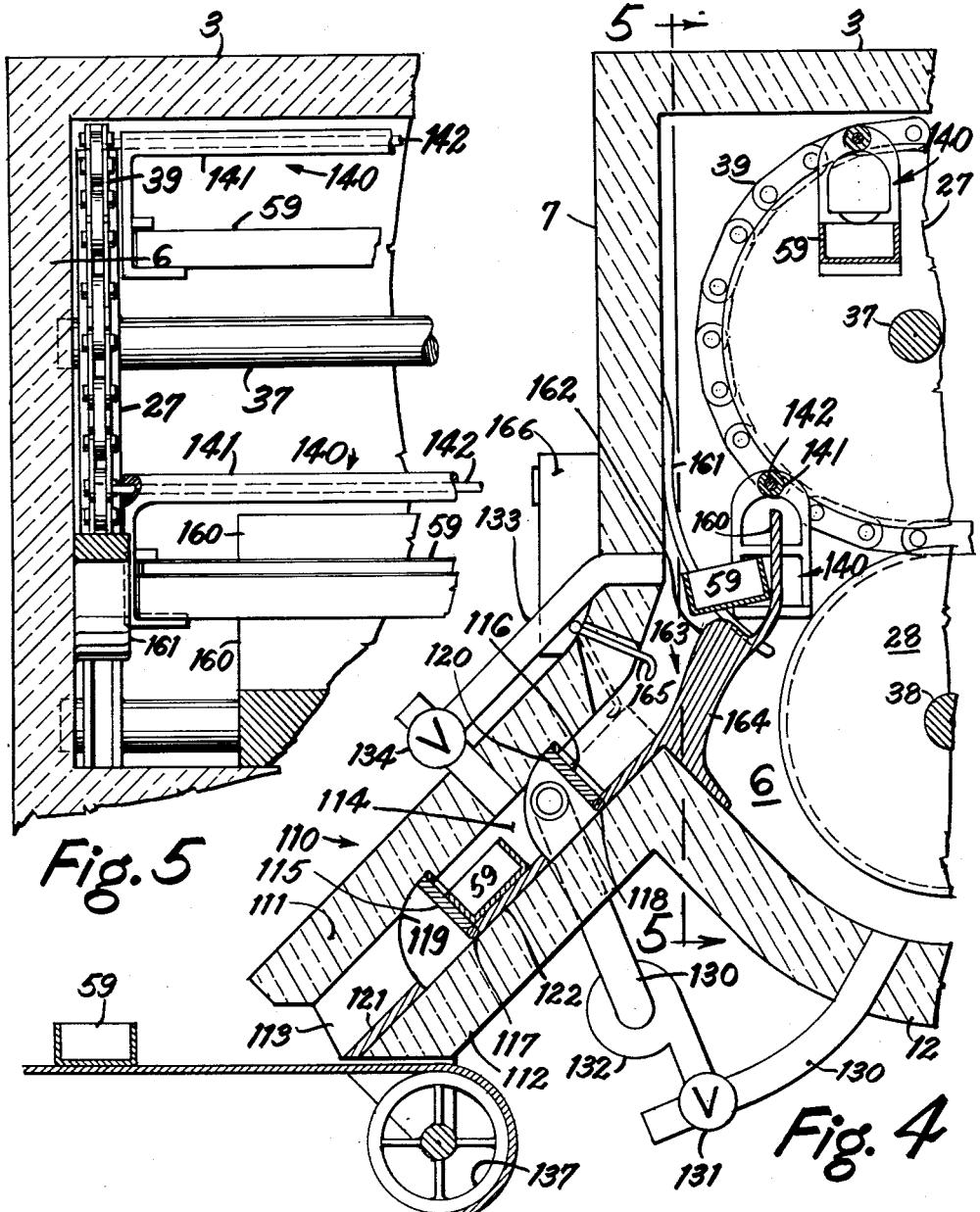

Feb. 27, 1962 W. L. MORRISON 3,022,636
METHOD AND APPARATUS FOR FREEZING COOKED FOODS
Filed Feb. 29, 1960 4 Sheets-Sheet 4
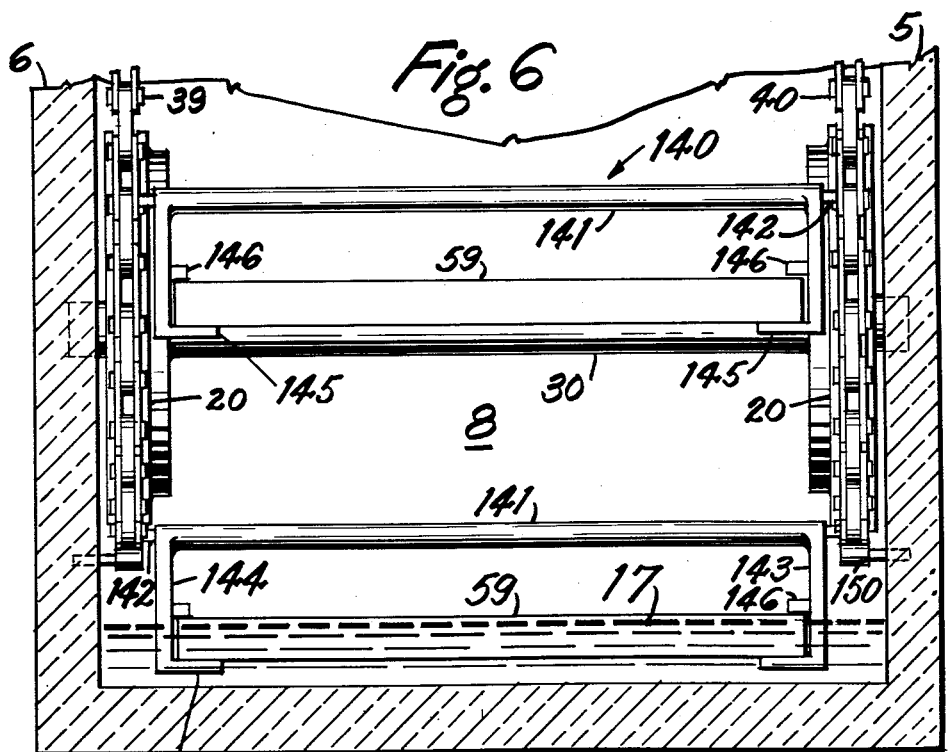
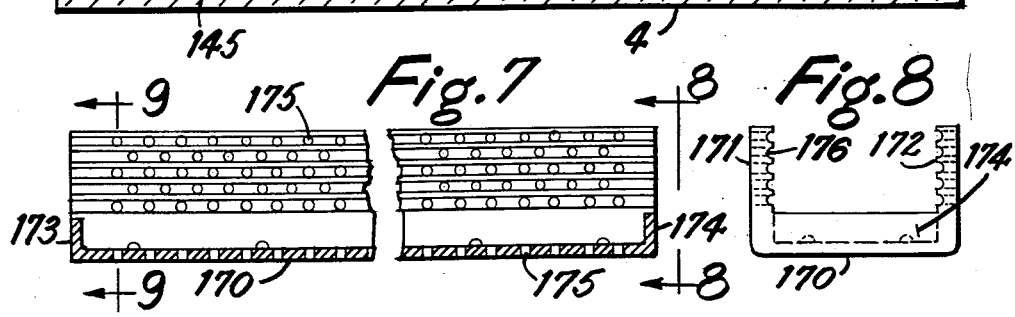
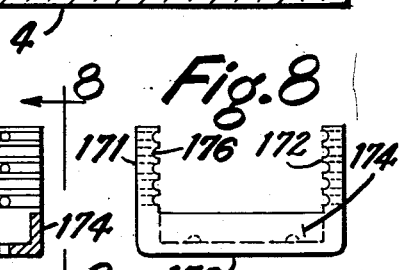
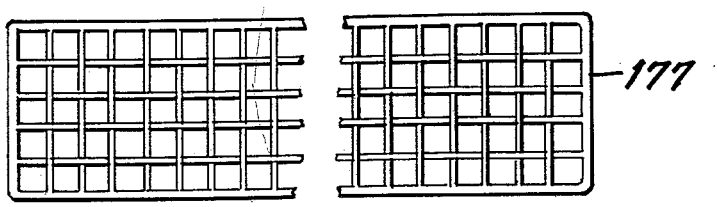
INVENTOR.
WILLARD. L. MORRISON
BY PARKER & CARTER
ATTORNEYS

United States Patent Office 3,022,636
Patented Feb. 27, 1962

3,022,636
METHOD AND APPARATUS FOR FREEZING COOKED FOODS
Willard L. Morrison, Lake Forest, Ill., assignor to Liquefreeze Company, Inc., New York, N.Y., a corporation of New York
Filed Feb. 29, 1960, Ser. No. 11,801
10 Claims. (Cl. 62—64)

My invention relates to the freezing of perishables, and particularly to a method and apparatus for quickly freezing cooked foods so as to preserve their flavor and aroma.

Quick freezing of perishables such as foodstuffs by exposing them to a refrigerant such as liquid nitrogen to cool them to temperatures far below zero degrees F. is a process rapidly coming to the fore as a quick and economical method of preserving foods. In this process, which is disclosed in my co-pending application Serial No. 679,311, the foodstuffs are directly exposed to the liquid nitrogen in a suitable container. In some instances the foodstuffs may be dipped into the liquid refrigerant, and in others the liquid refrigerant may be poured over the top of the foodstuffs. A common method of freezing cooked foods such as soups, pies, stews, etc., is to expose the food in an appropriate receptacle to a blast of cold, relatively dry air in a wind tunnel.

None of these methods, however, is particularly well adapted to quick freezing of cooked foods such as soups or pre-cooked vegetables because the turbulence in the freezing area sets up a circulation which promotes the dissipation of the light oils from the food. These light volatile oils cointain the food flavors and aroma, and if a considerable amount of moisture containing these light oils is evaporated from the food, the flavor of the food is largely lost before it is processed. The loss of flavor is particularly serious in wind tunnel cooling because as soon as the vapors leave the surface of the food, they are whisked away by the rush of cold air. Since wind tunnel cooling may require many hours, and considerable time is needed before a frozen crust forms on the exposed food surfaces, maximum flavor loss occurs.

Accordingly, a primary object of my invention is to provide a process which will preserve the flavors and aromas in perishable foodstuffs such as cooked foods by quickly freezing the foodstuffs to thereby prevent the escape of moisture containing light, volatile, aromatic oils from the foodstuffs.

Yet another object is to freeze cooked foodstuffs in a non-turbulent atmosphere so that loss of flavor from the foodstuffs is not aided by mechanical movement of the freezing medium.

Another object is to provide a quick freezing process for foodstuffs which is continuous.

Yet another object is to provide a continuous quick freezing process in which unfrozen foodstuffs may be continuously admitted, and frozen foodstuffs continuously withdrawn, yet only a negligible loss of freezing medium occurs.

A further object is to provide a continuous quick freezing process in which contamination of the freezing medium is held to a minimum.

Yet a further object is to provide a quick freezing process and apparatus capable of quickly freezing open and closed top food receptacle so that such diverse foodstuffs as cooked soup and solids may be processed in the same apparatus and by the same mode of operation.

Another object is to provide a method and apparatus for quickly freezing cooked foods whereby a frozen crust is quickly formed on the surfaces of the food exposed to the freezing medium so that subsequent evaporation is by sublimation only, not vaporization.

A further object is to provide a quick freezing apparatus in which loss or contamination of the liquid refrigerant in the freezing apparatus is extremely small.

Yet a further object is to provide a quick freezing apparatus in which the food stuffs can be directly dipped into a liquid refrigerant such as liquid nitrogen to thereby achieve the most effective heat transfer relationship between the foodstuffs and the refrigerant.

Yet another object is to provide a quick freezing apparatus in which the depth to which the food containers are immersed in the bath can be regulated so that maximum contact between the container and bath may be realized without danger of the refrigerant mixing with the food.

Other objects will become apparent upon a reading of the following description of the invention.

The invention is illustrated more or less diagrammatically in the accompanying drawings, wherein:

FIGURE 1 is a partly schematic side view of a quick freezing apparatus constructed in accordance with the principles of the present invention with parts indicated diagrammatically and others broken away for purposes of clarity;

FIGURE 2 is a partial, sectional view of the apparatus illustrated in FIGURE 1;

FIGURE 3 is a partial, sectional view taken substantially along the line 3—3 of FIGURE 2;

FIGURE 4 is a partial, sectional view of the exit mechanism;

FIGURE 5 is a partial, sectional view taken substantially along the line 5—5 of FIGURE 4;

FIGURE 6 is a partial, sectional view with parts omitted for clarity, taken substantially along the line 6—6 of FIGURE 2;

FIGURE 7 is a section through a typical food receptacle designed for use in the quick freezing apparatus of FIGURES 1 through 6.

FIGURE 8 is an end view taken substantially along the line 8—8 of FIGURE 7;

FIGURE 9 is a section through the receptacle of FIGURE 7 taken substantially along the line 9—9 of FIGURE 7;

FIGURE 10 is a section through a loaded receptacle of the type illustrated in FIGURE 7 which, for purposes of illustration, may be assumed to be taken at the same point through the receptacle of FIGURE 7 as the section of FIGURE 9; and FIGURE 11 is a plan view of a porous removable receptacle hold down shield utilizable in the receptacle of FIGURE 7.

Like reference numerals will be used to refer to like parts throughout the following description of the drawings.

My quick freezing apparatus is indicated generally at 1 in FIGURE 1. It comprises essentially a freezing chamber 2 having top, bottom, side and end walls 3, 4, 5, 6, 7 and 8 composed of any suitable insulating material which forms a substantially gas and liquid tight freezing chamber. A plurality of refrigerant exit and entrance pipes are indicated at 13, 14 and 15 near the lower left portion of the freezing chamber. Although any suitable arrangement may be utilized, I find it convenient to admit liquid refrigerant to the chamber through pipe 13, connect pipe 14 to a reservoir of liquid refrigerant, and utilize pipe 15 as an overflow and liquid level maintaining means. Pipe 15, for example, may have a valve 16 which, when open, enables a level of refrigerant to be maintained in the freezing chamber somewhat below the reservoir pipe 14. Although a single overflow pipe 15 has been illustrated, it will be understood that a pipe opening into the freezing chamber at a substantially lower level and inclined upwardly having a plurality of valves at varying levels, or any other suitable overflow mechanism, may be utilized. In this instance, a quantity of liquid refrigerant 17 is shown at the level of the depth pipe 15.

A pair of chain sprockets is indicated at 20, idlers from 21 to 28 inclusive. The sprockets and idlers are carried by shafts 30, 31, 32, 34, 35, 36, 37 and 38 journalled in suitable bearings, not shown. A pair of flexible chains 39, 40 composed of a plurality of links similar to bicycle links are trained about the sprockets and idlers back and forth in serpentine fashion. As illustrated, the major runs are horizontally disposed and substantially parallel one to another. Bottom run 41 is disposed in such proximity to the bottom of the chamber that food carrying receptacles 42 may be at least partially immersed in the liquid refrigerant 17. Suitable means may be provided for raising and lowering at least the bottom pairs of sprockets 20, 21 to regulate the depth to which different sized food receptacles are immersed in the bath. A motor 43 drives an external drive sprocket 44 through a drive chain 45. Drive sprocket 44, which is secured to the outwardly projecting end of shaft 30, in turn drives sprocket 20 and the rest of the sprockets through the chains 39, 40. An exhaust conduit is indicated at 46 at the top of the freezing chamber for the warmed up gases.

Perishable foodstuffs are admitted to the freezing chamber by an entrance mechanism indicated generally at 50 in FIGURES 1 and 2. The entrance mechanism includes an admission chamber 51 which is formed by top, bottom, side and end walls 52 through 55, respectively, as illustrated best in FIGURES 2 and 3. The chamber is divided roughly in two by a removable door 56 which is raised and lowered by any suitable mechanism indicated generally at 57.

The chamber is recessed as at 58 so that food receptacles 59 may be admitted to the chamber. In this instance, right side wall 54 has been apertured as at 60 to conform generally to the shape of a frozen food receptacle 59. Although the food receptacle 59 has been illustrated as a shallow tray substantially wider than it is deep, and substantially longer than it is wide, any suitable configuration may be utilized. It may be made of metal, plastic or any other material suitable for containing warm food before it is frozen and cold food after it is frozen.

An insertion mechanism, indicated generally at 61, includes a hydraulic cylinder 62 from which a reciprocable piston rod 63 projects. The piston rod terminates in a plunger 64 which slides in close fitting engagement within the recess 58 and which, when in the position illustrated in FIGURE 2, overlies the insertion aperture 60. An adjustable stop member 65 limits the upward and downward travel of the piston. Inlet and outlet hydraulic lines 66, 66a, and 67, 67a, respectively, are connected to hydraulic pump 68 through a suitable valve 69. A return line is indicated at 70. Inflow of hydraulic fluid through inlet pipe 66 and outflow through line 67a depresses the piston to permit insertion of a receptacle through aperture 60. Reversal of valve 69 to bleed the hydraulic fluid out of the cylinder above the piston through line 67 and admit fluid to the cylinder through line 66a causes the piston to move upwardly into the position of FIGURE 3 from which the food receptacle 59 may be moved into the freezing chamber.

A purging system for maintaining a cold inert atmosphere within chamber 51 is indicated generally at 72 in FIGURE 1. The purging system comprises a return gas line 73 connecting the admission chamber to the left of door 56 to the freezing chamber, and an inlet line 74 which similarly connects the two chambers. A two-way valve is indicated at 75 and can be so manipulated as to connect the admission and freezing chambers while blocking communication of the admission chamber to the atmosphere, or, alternately, to vent the admission chamber to atmosphere while preventing escape of vaporized refrigerant from the freezing chamber. Another two-way valve is illustrated at 77 in intake line 74. This valve likewise may be manipulated to connect the admission chamber to the freezing chamber, or, alternately, to vent the admission chamber to atmosphere while blocking communication between the freezing chamber and atmosphere. A continuously running gas pump 78 induces a forced circulation of vaporized refrigerant from the freezing chamber through the admission chamber, or from atmosphere through admission chamber.

A reciprocating mechanism for moving foodstuff receptacles from the admission chamber into the freezing chamber is indicated generally at 80 in FIGURE 2. The mechanism comprises a pair of shafts 81, 82 which terminate in drive wheels 83, 84 located on the side of admission chamber wall 54. Motors 85, 86 drive drive wheels 83, 84, respectively, through suitable chains or belts, not numbered.

Shafts 81, 82 terminate in swinging arms 87, 88 inside the admission chamber. The extremities of the arms are secured by suitable means 89, 90 to slotted links 91, 92 which are integral with generally horizontally oriented actuating members 93, 94. Each actuating member slides along a slideway 95 formed in the bottom wall 53 of the admission chamber and includes a pair of upstanding projections 96. Each projection carries at its upper end a swinging pusher arm 97 which terminates in an offset portion 98 adapted to fit over the edge of a food receptacle 59. Stop members 99 limit the swing of arms 87 and 88 to prevent impingement of the arms against the top of the admission chamber. In the illustrated embodiment, a pair of pusher arms 97 are welded to sleeves 100 which are rotatably received on shafts 101. The shaft ends are journalled in suitable apertures in the projections 96.

An exit mechanism for removing frozen foodstuffs from the freezing chamber is illustrated in detail in FIGURES 4 and 5. The mechanism, indicated generally at 110, is formed essentially as a downwardly inclinded chute having upper and lower walls 111, 112 and side walls 113. The exit mechanism includes an exit chamber 114 which is formed by the upper, lower and side walls and a pair of swinging doors 115, 116 hinged at their lower edge about pintles 117 and 118. Upper wall 111 is recessed as at 119, 120 so that when the swinging doors are in their raised position, as illustrated in FIGURE 4, a tight seal is formed between the upper wall and the doors. A suitable sliding base formed of discontinuous sheets having substantially the same thickness as the swinging doors is indicated at 121, 122. Section 122 is slightly longer than receptacle 59 so that when forward door 116 swings upwardly it will clear the trailing edge of the receptacle.

A gas inlet pipe is indicated at 130 opening into the freezing chamber 2 and exit chamber 114. A three-way valve 131 is interposed in the inlet line 130 and is operable to make communication between the freezing and exit chambers, or vent the exit chamber to atmosphere while blocking communication between the exit and freezing chambers, or to connect the exit and freezing chambers. A continuously operating gas pump 132 induces a circulation of either vaporized refrigerant or air through the upper portion of gas pipe 130 into the exit chamber 114.

A return gas line is indicated at 133 connecting the admission freezing chambers. A three-way gas valve 134 is operable to connect the two chambers directly to one another or, alternately, to vent exit chamber 114 to atmosphere.

Food receptacles 59 which leave the exit mechanism 110 slide downwardly over terminal portion 121 of the slideway and onto a continuously rotating conveyor 136 trained about any suitable supporting structure 137.

A typical cradle 140 for supporting the food receptacles in the freezing chamber is illustrated in FIGURES 2, 4 and 6. It consists of an elongated sleeve 141 loosely pivotally received on a supporting shaft 142 whose ends are journalled in suitable openings in oppositely disposed links of drive chains 39, 40. A pair of downwardly depending arms 143, 144 are welded to each end of sleeve 141 and each arm terminates at its lower end in a pair of inwardly turned lips 145, 146. The distance between the lips 145, 146 is approximately equal to the height of a food receptacle 59 so that the receptacle will not tilt. As the cradles move vertically and then horizontally, the sleeves 141, which are freely rotatable about the supporting shafts 142, remain vertical in a manner very analogous to the operation of a Ferris wheel.

In FIGURES 2 and 6, a trigger mechanism for controlling operation of the admission mechanism and the movement of the food receptacles through the freezing chamber is illustrated. A spring loaded switch 150 projects into the freezing chamber in line with the path of movement of the cradles. When the cradle strikes the switch, a set of contacts indicated generally at 151, in control box 152, are closed. Control box 152 contains suitable mechanism for correlating operation of the inlet mechanism and the main sprocket driving motor 43, as will be explained in more detail hereinafter.

Similar mechanism for actuating the exit mechanism is illustrated best in FIGURE 4. In this instance, as a receptacle containing frozen food descends from uppermost sprocket 27, it is tipped off the cradle by upwardly projecting apron 160. Suitable cams 161 are so designed that the lower inwardly extending lips 145 of the cradles slide along them so that the cradle is maintained generally vertical while the receptacle is being tipped off by the apron 160. An abutment 162 projects outwardly from the smooth inner surface of the apron 160 and is so positioned as to strike the bottom of the receptacle 59 before it has a chance to rotate a full 90 degrees in a counterclockwise direction. The weight of the receptacle causes it to tilt over however, once it strikes the projection 162, and slide down the narrow mouth 163 formed between the freezing chamber wall 12 and bottom portion 164 of the apron structure. As the receptacle slides down along the upper surface of apron structure 164 it trips spring-loaded switch 165 and comes to rest against the upper valve door 116. Tripping of switch 165 actuates suitable timing mechanism in control box 166 which operates the discharge mechanism, as will be explained in detail hereinafter.

A receptacle suitable for use in my quick freezing apparatus is illustrated in detail in FIGURES 7 through 11. In FIGURES 7 and 8, the receptacle is shown as composed of bottom, side and end walls 170, 171, 172, 173 and 174, respectively. A plurality of apertures 175 are located in all walls to permit inflow and outflow of liquid refregerant when the receptacle passes along the bottom run 41 in the freezing chamber. The end walls 173, 174 extend upwardly above the bottom wall only a short distance, and the side walls 171, 172 are formed with a plurality of grooves or slots 176 which receive the porous mesh frame or hold down shield receptacle 177 of FIGURE 11. It will be understood that in the operation of my mechanism, the food to be frozen is placed in the bottom of the receptacle and the mesh frame 177 slid into a pair of opposing recesses 176 which are slightly above the upper edge of the food receptacles. The porous frame prevents the food from floating upwardly should the food be of a lesser specific gravity than the liquid refrigerant in the bottom of the freezing chamber, yet the openings in the mesh permit the liquid refrigerant to flow over the top of the individual food packages. The slightly upturned end walls 173, 174 prevent the food packages from sliding endwise out of the food receptacle.

In FIGURES 9 and 10, a tray and hold down shield 177 are illustrated to show the relative dimensions, and in FIGURE 10 a receptacle having a food container 178 which holds the foodstuff 179 to be frozen, is illustrated. It will be noted that in FIGURE 10 the screen 177 is positioned in the second set of recesses so as to closely overlie the top of the food container 178.

The use and operation of my invention is as follows:
The hydraulic pump 68 is continuously operated, as is the gas pump 78, and 132.

Assume that the primary drive motor 43 is turning over to rotate the drive sprockets 20 and move the chain along its traverse. When a cradle 140 strikes inwardly extending switch 150, a contact is made at 151 which stops motor 43 and consequently the movement of the conveyor through the freezing chamber. As soon as the conveyor stops, hydraulic valve 69 is actuated to admit hydraulic fluid to the upper end of cylinder 62 through inlet pipe 66. At the same time, hydraulic fluid beneath the piston in cylinder 62 is bled outwardly and returns to pump 68 through return line 70. When the piston 63 reaches its bottom position as regulated by adjustable stop 64, a tray containing food to be frozen is inserted into the admission chamber 51 through aperture 60.

As soon as the tray is properly positioned on top of plunger 64, hydraulic valve 69 reverses, and hydraulic fluid enters cylinder 62 through bottom inlet line 66a and is forced out of the cylinder through the upper line 67. The piston travels upwardly carrying the tray and comes to rest with the tray at the level of the bottom of admission chamber 51, as illustrated in FIGURE 2. In this position, plunger 64 then blocks insertion aperture 60 to seal admission chamber 51.

As soon as the upper limit of travel of piston 63 is reached, valve 75 opens to atmosphere and valve 77 opens to the bath. Continuously operating pump 78 then circulates vaporized refrigerant from the freezing chamber through inlet pipe 74 into the admission chamber 51 and out to atmosphere through valve 75. When the admission chamber is filled with vaporized refrigerant and the air has been completely flushed therefrom, valves 75 and 77 close to block communication between the two chambers. Raising mechanism 57 then lifts removable wall 56 upwardly to the dotted line position of FIGURE 1. As soon as the reciprocable wall 56 reaches its uppermost position, motor 85 is actuated to induce counterclockwise rotation of shaft 81. This in turn moves actuating member 93 forward to the dotted line position of FIGURE 2 as the swinging arm 87 slides along the slot in link 91. The individual trays are, of course, pushed forward by the offset portions 98 of the elongated pusher arms 97.

Motor 85 is then reversed to retract rearmost member 93. As the actuating member retracts, the pusher arms 97, which are freely swingable about their pivot points 89, swing upwardly slightly and ride over the top of the next most rearwardly positioned tray. As can be readily seen from FIGURE 2, each pusher arm 97 has a downwardly inclined trailing portion which impinges upon the leading edge of the food receptacles to cause the arms to ride up and over the receptacles. Stationary finger 97a holds rearmost rocker arm 97 up preparatory in readiness for the next food receptacle.

As soon as motor 85 has returned actuating member 93 to the solid line position of FIGURE 2, motor 86 is actuated to move right member 94 from its solid line position of FIGURE 2 backwardly to the dotted line position of FIGURE 2. As it moves rearwardly, the rocker arms 97 ride up and over the stationary food trays in the same manner as did the rearwardly positioned rocker arms 97. Movement of member 94 rearwardly is accomplished by clockwise rotation of arm 88. As soon as sliding member 94 has moved rearwardly a distance sufficient to permit offset portions 98 of the rocker arms to engage the rear edges of the food receptacles (as indicated in the solid line positions of FIGURE 2), motor 86 is actuated in a forward direction. Forward rotation of the motor swings arm 88 in a counterclockwise direction which moves the leading food tray onto the cradle and advances each tray one position. An automatic timer, door 56 being closed, energizes main drive motor 43 to start the conveyor and the conveyor moves until the next cradle strikes switch 150.

Each loaded cradle moves through the freezing chamber by stages, starting and stopping at intervals determined by the spacing of the cradles on the conveyor chains. Immediately after the food trays are placed on the cradles, they are immersed in the liquid nitrogen, and the first portion of the run exposes the food receptacles directly to the liquid nitrogen so that maximum heat transfer occurs at the beginning of the travel of the receptacles through the chamber. As a consequence, the exterior surfaces of the food are immediately frozen hard to thereby form a crust which prevents the escape of the volatile oils which contain the food flavors and aroma. As the trays progress through the liquid nitrogen, the depth of freeze increases and in many instances the food receptacles are frozen completely solid before they reach the end of the first run 41. The vaporized refrigerant, which may be at a temperature in the order of −300 to −320 degrees F. is in continuous heat exchange relationship with the receptacles so long as they are in the bath.

The food receptacles are discharged by the apparatus illustrated best in FIGURE 4. As a tray descends around upper left guide pulley 27, it is removed by the upwardly extending apron 160 and forced down the chute 110. Cams 161 cause the individual cradles 140 to remain substantially vertical as they move along so that the receptacle will be positively separated from the cradle. This is especially advantageous if any ice has formed between the bottom of the food receptacle and the inwardly extending lugs on the cradle.

As the tray or food receptacle slides down the chute 110, it trips spring-loaded switch 165, and comes to rest against the upper valve door 116. Tripping of switch 165 actuates mechanism in control box 166 controlling electrical relays which in turn energize and de-energize two-directional servo-electric motors connected to the purging compartment doors 116 and 117. The valves work in substantially the following sequence.

Valve 134 connects exit chamber 114 to atmosphere. Valve 131 then connects the freezing chamber to the exit chamber and pump 132 purges the exit chamber with vaporized nitrogen from the bath. Valves 131 and 134 then close substantially simultaneously to isolate the exit chamber with a neutral atmosphere in it. Gate 116 then opens and the food receptacle slides downwardly into position against the lower door 115, as illustrated in FIGURE 4. Gate 116 then closes maintaining the nitrogen atmosphere in the exit chamber. Valve 134 then connects the exit chamber 114 to the bath and valve 131 connects the exit chamber through the pump to atmosphere. The valves are in this position only for a period of time sufficient to replace the nitrogen in the exit chamber with atmosphere. Timing here is very critical for it is necessary that valve 134 close before any appreciable amount of air is admitted to the freezing chamber. Valves 134 and 131 are then closed and lower gate 115 opens permitting the tray to slide downwardly onto the continuously rotating conveyor belt 136. The trays are then moved to further processing stations.

As an alternative mode of operation, valve 131 need not open to atmosphere after tray 59 is enclosed within the chamber. This procedure, of course, will result in the loss of some nitrogen vapor from the chamber when lower door 115 opens, but the loss of nitrogen may be more than compensated by the elimination of the risk of admitting air to the freezing chamber. Even when employing the first described sequence of operations, however, contamination of the bath by the ambient atmosphere is held to a minimum.

The above description is intended to be illustrative only and accordingly the scope of the invention should be limited only by the scope of the following appended claims.

As shown in FIGURES 2 and 3, the wheel 20 is shouldered to engage the bucket 140 so that when the trays are pushed radially onto the bucket, it cannot rock away. Thus at the loading point, the bucket in contact with the shoulder is held rigid during the stop for loading.

I have disclosed the idlers as smooth. They may be toothed if desired but since only one idler drives, a smooth idler is satisfactory.

I claim:

1. A method of freezing foodstuffs so as to preserve their flavors, said method comprising the steps of providing an inlet chamber and admitting the foodstuffs to said inlet chamber, flushing the inlet chamber with a cold gas inert to the foodstuffs, passing the foodstuffs into a freezing chamber containing a cold boiling liquid at a temperature substantially below zero degree F. without exposing the freezing chamber to ambient atmosphere, freezing the foodstuffs to a temperature substantially below zero degree F. by exposing them to the cold boiling liquid and stationary vapors, providing a discharge chamber and purging it with a gas inert to the foodstuffs, passing the frozen foodstuffs into the purged discharge chamber without exposing the freezing chamber to ambient atmosphere, and discharging the frozen foodstuffs from the discharge chamber without exposing the interior of the freezing chamber to ambient atmosphere.

2. A method of freezing foodstuffs so as to preserve their flavors, said method comprising the steps of providing an inlet chamber and admitting the foodstuffs to said inlet chamber, flushing the inlet chamber with a cold gas inert to the foodstuffs, passing the foodstuffs into a freezing chamber containing a cold boiling liquid at a temperature substantially below zero degree F. without exposing the freezing chamber to ambient atmosphere, freezing the foodstuffs to a temperature substantially below zero degree F. by exposing them to the cold boiling liquid and stationary vapors, providing a discharge chamber and purging it with cold vapor from the freezing chamber, passing the frozen foodstuffs into the purged discharge chamber without exposing the interior of the freezing chamber to ambient atmosphere, returning the cold vapor in the discharge chamber to the freezing chamber without exposing the interior of the freezing chamber to ambient atmosphere, and discharging the frozen foodstuffs from the discharge chamber.

3. The method of claim 2 further characterized in that the discharge chamber is purged by ambient atmosphere to thereby return the cold vapor to the freezing chamber.

4. The method of preserving the flavor of foodstuffs by freezing which includes the steps of initially chilling the foodstuffs by exposing them to a cold, stationary, inert gas in a confined volume, passing the initially chilled foodstuffs into a freezing chamber containing the inert gas in liquified form without exposing the chamber to ambient atmosphere, freezing the foodstuffs to a temperature substantially below zero degree F. by exposing the initially chilled foodstuffs directly to the cold boiling liquid and its vapors, said vapors being relatively stationary, passing the frozen foodstuffs into a discharge chamber containing cold vapor from the freezing chamber without exposing the freezing chamber to ambient atmosphere, returning the cold vapor in the discharge chamber to the freezing chamber by purging said discharge chamber with ambient atmosphere, and discharging the frozen foodstuffs from the discharge chamber.

5. Apparatus for quickly freezing perishables such as cooked foods including a substantially gas-tight freezing chamber adapted to hold a quantity of refrigerant initially at least in liquid form, means for preventing escape of refrigerant from the freezing chamber while admitting perishables to the chamber, means for moving the perishables about the freezing chamber to thereby expose the perishables to the refrigerant, and means for preventing escape of refrigerant from the freezing chamber while removing the perishables in a frozen condition from the freezing chamber, the first named means includes a substantially gas-tight admission chamber having a movable portion which exposes said admission chamber to the freezing chamber, means for inserting perishables into the admission chamber, means for purging the admission chamber subsequent to the insertion of perishable materials with vaporized refrigerant, means for opening the movable portion of the admission chamber after purging, means for passing the perishables into the freezing chamber, and means for closing the movable portion of the admission chamber subsequent to placement of the perishables in the freezing chamber.

6. The quick freezing apparatus of claim 5 further characterized in that the purging means includes a first gas line between the admission chamber and the freezing chamber, first valve means in the gas line operable to alternately connect the admission and freezing chambers and to vent the admission chamber to atmosphere, a second gas line between the admission and freezing chambers, second valve means in the second gas line operable to alternately connect and disconnect the chambers, and means for coordinating operation of the valve means.

7. The quick freezing apparatus of claim 6 further characterized by and including pump means in the second gas line operable to force vaporized refrigerant from the freezing chamber through the admission chamber when the first valve means connects the admission chamber to vent and the second valve means connects the admission chamber to the freezing chamber.

8. The quick freezing apparatus of claim 5 further characterized in that the means for preventing escape of refrigerant from the freezing chamber while removing the frozen perishables includes a substantially air-tight exit chamber having a movable portion which exposes said exit chamber to the freezing chamber, means for inserting perishables into the exit chamber, means for purging the exit chamber with vaporized refrigerant prior to insertion of the frozen perishables into said exit chamber, means for isolating the exit chamber from the freezing chamber, and means for discharging the frozen perishables from the exit chamber subsequent to the isolation of the exit and freezing chambers from one another.

9. The quick freezing apparatus of claim 8 further characterized by and including means for returning vaporized refrigerant from the exit chamber to the freezing chamber subsequent to the insertion of the perishables into the exit chamber.

10. The quick freezing apparatus of claim 9 further characterized in that the means for purging the exit chamber with vaporized refrigerant and for returning the refrigerant to the freezing chamber includes a gas line between the freezing chamber and the exit chamber, third valve means in said gas line operable alternately to connect the chambers and to connect the exit chamber to atmosphere, a return gas line between the exit chamber and the freezing chamber, fourth valve means operable alternately to connect the chambers and to connect the exit chamber to atmosphere, and pump means for circulating gases through the exit chamber and gas lines.

References Cited in the file of this patent
UNITED STATES PATENTS

| 1,940,192 | Sorber | Dec. 19, 1933 |
| 1,944,857 | Atwell | Jan. 23, 1934 |